Dec. 19, 1950 T. I. RESS 2,534,369

CATHODE-RAY TUBE SELECTOR SYSTEM

Filed Dec. 22, 1947

INVENTOR.
THOMAS I. RESS

BY Karl F. Ross

AGENT

UNITED STATES PATENT OFFICE 2,534,369

CATHODE-RAY TUBE SELECTOR SYSTEM

Thomas I. Ress, Chicago, Ill.

Application December 22, 1947, Serial No. 793,267

6 Claims. (Cl. 177—353)

My invention relates to telecommunication systems and, more particularly, to systems wherein a central station has associated with it a number of substations which may be selectively called from the central station by way of a common signaling channel.

The invention, while not limited thereto, is particularly applicable to systems wherein a large number of subscribers are adapted for two-way traffic among one another by wireless communication, a connection being established by signaling to a central office common to all subscribers whereupon the central office sends out a code signal representative of a particular substation indicated by the calling subscriber. The substations referred to may be vehicles carrying equipment for communication among themselves, or with a fixed or mobile central station (as between a mother craft and its fleet), yet the invention is equally adapted for use with fixed stations interconnected over a metallic circuit.

In any of the instances mentioned, it is desirable to transfer each incoming call at the central office as quickly as possible to the called substation, in order to make the central office equipment available to other callers without undue delay when, as it often happens, two or more subscribers call the office at the same time. One of the chief sources of delay, in known systems of this character, is the inability of the selector mechanism of the substations to respond to the proper call signal with any degree of rapidity, so that it is often necessary to store a call for a relatively long time on a register of the central office, or to give a busy signal to a would-be caller, until the channel is cleared for the next code combination.

It is, thus, an object of the present invention to provide a selective calling system operable at high speed.

Another object of my invention is to provide a telecommunication system, of the character described, wherein a particular code signal is registered at a respective substation by electronic means, and without the intervention of mechanical selector devices.

A further object of my invention is to provide, in a system of the character described, simple and inexpensive means adapting commercially available cathode ray tubes for use as selective receiving devices.

Still another object of the invention is to provide, in a substation affiliated with a selective calling system, electronic discriminator means adapted to be rendered responsive to different code signals by simple mechanical changes.

Yet a further object of this invention is to provide, in a telecommunication system of the character described, call transmitting and receiving means operating by the generation and demodulation, respectively, of a pulse-time modulated carrier wave.

A still further object of the present invention is to provide a method of selectively calling a substation, or a group of substations, by a code combination of interleaved pulses periodically repeated.

Briefly, the invention contemplates the steps of synchronously deflecting the rays of two cathode ray tubes, located respectively at the transmitting and at the receiving station, deriving a series of pulses from the ray of the first tube during each of its scanning cycles, and using these pulses to trigger, or modulate in intensity, the ray of the second tube, whereby the latter ray will be caused to excite certain targets if the time position of the pulses received within each scanning cycle corresponds to the space position of the targets with respect to the scanning sweep. An alarm device at the receiver will be actuated only when all the targets are excited in the same scanning cycle, and the relative position of the targets will be different for each receiving station associated with a particular transmitter so that but a single receiver will correctly respond to a particular pulse combination.

According to another feature of the invention, the targets may be photo-sensitive devices located outside the cathode ray tube, masking means being inserted between the fluorescent screen of the tube and the said devices in such a manner that the latter will respond only when certain narrowly defined portions are, respectively, lit up. This arrangement makes it possible to use ordinary, fluorescent-screen cathode ray tubes in each receiver and to make all adjustments by modifying the masking means and varying the relative position between the photosensitive devices and the screen.

The above and other features and objects will become apparent and the invention will be more clearly understood from the following description of a preferred embodiment, reference being had to the accompanying drawing in which.

Figures 1, 2, 3:
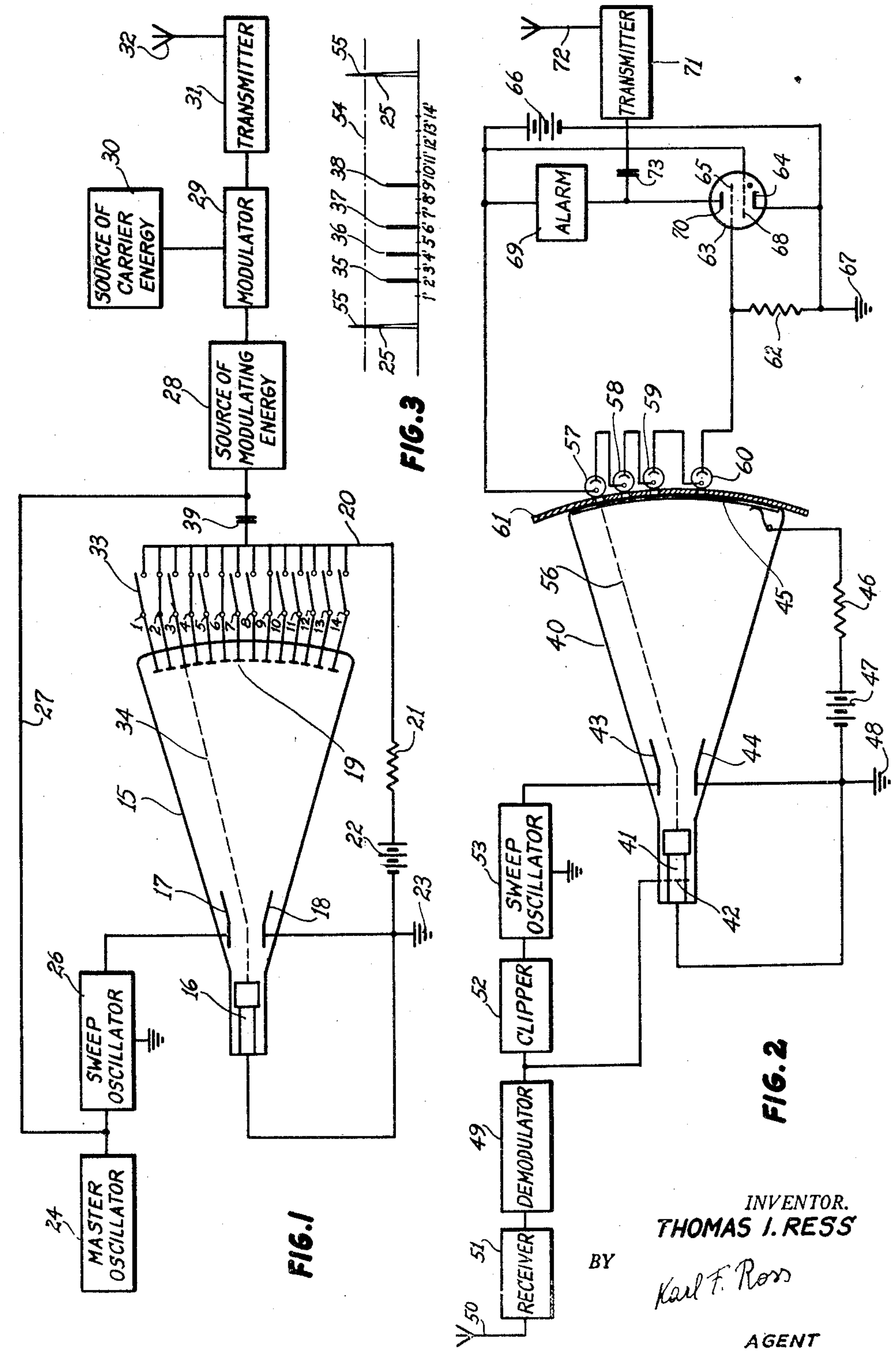
Fig. 1 shows the transmitting arrangement of a central station in a system according to the invention.
Fig. 2 shows the receiving arrangement of a substation affiliated with the central station of Fig. 1.
Fig. 3 is a graph illustrating a particular code combination.

In Fig. 1, there is shown at 15 a cathode ray tube comprising an electron gun 16, a pair of deflecting electrodes 17, 18 and fourteen target electrodes 19. There are further provided fourteen terminals, indicated at 1 through 14, which are connected to respective target electrodes 19. A bus bar 20 is connected, by way of a resistor 21, to the positive terminal of a power source shown here diagrammatically as a battery 22. The negative terminal of source 22, which may be grounded as shown, is returned to the electron gun 16, and the deflecting electrode 18 is also shown grounded at 23.

A master oscillator 24 produces a train of trigger pulses 25 (Fig. 3) which are applied to a sweep oscillator 26 and are also fed, over a conductor 27, to a source of modulating energy 28. The source 28 may be an audio frequency oscillator which modulates, in a modulator 29, the energy received from a carrier wave generator 30. The carrier wave may be of ultra high frequency and may be modulated, e. g. in amplitude or in frequency, by the modulator 29. A transmitter 31, provided with an antenna 32, is connected to the output of modulator 29.

The terminals 1 through 14 are adapted to be selectively connected to the bus bar 20 by means of respective connectors 33 of which there are fourteen. These connectors may be the armatures of respective relays, the contact springs of respective switches, or any other means for establishing a conductive connection between a terminal and the conductor 20. The connectors 33 are normally in open-circuit position, it being asuumed in the present example that any combination of four of these connectors may be operated to connect the associated terminals to conductor 20. Mathematically, it can be shown that the number of possible combinations obtainable in this manner is $$\binom{14}{4}=1,001$$

it being thus possible to accommodate a system of one thousand subscribers (to use a round figure) with the arrangement illustrated. (In order to accommodate ten thousand subscribers, it would merely be necessary to increase the number of targets to twenty-four whereby the number of possible combinations will rise to $$\binom{24}{4}=10,626.)$$

In Fig. 1 it is shown, by way of example, that terminals 2, 4, 6 and 9 are connected to battery by means of the respective connectors 33 associated therewith. Sweep generator 26, which is triggered by the pulses 25 from master oscillator 24, produces a sawtooth wave which deflects the ray 34 and causes it to impinge, successively, upon the targets 19 connected to respective terminals 1 through 14. It will be seen that a pulse will appear across the resistor 21 when the ray strikes the second, fourth, sixth and ninth target, these pulses being shown at 35, 36, 37 and 38 in Fig. 3. Condenser 39 applies these pulses to the source 28 which latter, therefore, will be triggered or modulated in accordance with the code pattern shown in Fig. 3. The amplitude of the synchronizing pulses 25 preferably exceeds that of the code pulses 35—38.

Turning now to Fig. 2, there is shown a cathode ray tube 40 comprising an electron gun 41, an intensity control electrode 42, a pair of deflecting electrodes 43, 44 and a fluorescent screen formed by a layer 45 on the inner wall of the tube envelope. Screen 45 is connected, by way of a current limiting resistor 46, to the positive pole of a power source shown as a battery 47. The negative pole of battery 47 is grounded at 48, as is the deflecting electrode 44, and is returned to the electron gun 41.

The control electrode 42 of tube 40 is connected to the output of a demodulator 49 to which signal energy from receiving antenna 50 is applied by receiver 51. The output of demodulator 49 is also applied to a clipper 52 and, thence, to a sweep oscillator 53 which is connected across the deflecting electrodes 43, 44. Clipper 52 has a threshold 54 (Fig. 3) so that only the tips 55 of pulses 25 reach the sweep oscillator 53, these tips acting as trigger pulses to synchronize this oscillator with sweep oscillator 26 of Fig. 1. The pulses applied to the control electrode 42 are of such a polarity that the ray 56 of tube 40 will be triggered on whenever a pulse 35, 36, 37 or 38 appears in the output of demodulator 49, the ray being suppressed between pulses.

A group of photocells 57, 58, 59 and 60 are positioned adjacent the screen 45 but externally of the tube 40, a mask 61 being interposed between these photocells and the screen. The photocells are positioned so, and the mask 61 is apertured in such a manner, that each photocell will be excited only when a portion of the screen respectively opposite thereto is lit up. In the arrangement shown, cell 57 will be excited by a pulse in position 2′ (Fig. 3), cell 58 by a pulse in position 4′, cell 59 by a pulse in position 6′, and cell 60 by a pulse in position 9′, time positions 1′ through 14′ corresponding to the space positions of targets 19 (Fig. 1) associated with terminals 1 through 14, respectively. Hence, if the pulses 35, 36, 37 and 38 occupy the positions indicated, all the cells 57, 58, 59 and 60 will be successively excited.

The photocells 57, 58, 59 and 60 are connected in series with one another and with the input resistor 62 of a thyratron 63, resistor 62 being connected across the cathode 64 and grid 65 of the thyratron. A source of direct current, shown here as a battery 66, is connected across the series combination of resistor 62 and cells 57 through 60 and also supplies space current to the tube 63 when the latter is energized. The negative terminal of battery 66 is connected to the cathode 64, grounded at 67, while its positive terminal is connected to the second grid 68 of the thyratron and also, by way of an alarm device 69, to the plate 70 of the tube 63. A transmitter 71, provided with an antenna 72, is shown connected to the plate 70 by way of a condenser 73.

If all four photocells are excited simultaneously, a fact made possible by the persistence of the fluorescent screen material, a voltage drop will exist across the resistor 62 and thyratron 63 will be energized. When this occurs, the alarm device 69 will be operated and the transmitter 71 will be actuated to send a return signal to the central station, indicating that the call has been registered and freeing the signaling channel for further calls. It will be understood that the return signal may be similar to the code signal shown in Fig. 3 and may be used at the central station to restore, successively, the connectors associated with terminals 2, 4, 6 and 9 to open-circuit position, thus serving as an indication that the station receiving the call was the one desired.

The alarm device may be a mechanical or electronic relay, a lamp or any other signal of the visual or audible type, adapted to become de-energized when the subscriber operates his receiver hook (not shown) or in some other manner manifests that he has noticed the call.

If it be desired to call several substations simultaneously, this may be accomplished by actuating five, six or more connectors 33 at the same time. Thus it will be possible to call $$\binom{5}{4}=5$$

stations by using five code pulses, $$\binom{6}{4}=15$$

stations by using six pulses, and so on. All the substations of the system may be called by simultaneously connecting all the terminals 1 through 14 to the bus bar 20. It will also be possible to use a particular signal (e. g. the 1001st combination in a four-in-fourteen system) for special or emergency purposes; if sent in combination with the call signal of a particular substation, it may serve to advise the subscriber of the special nature of the call (the provision of additional photocells and of a separate alarm circuit at the substations, for this purpose, will be obvious from the foregoing description).

It will be appreciated that the scanning speed of cathode ray tube 40 and, hence, the working frequency of master oscillator 24 should be selected sufficiently high so that the afterglow of the fluorescent screen persists for at least a full scanning cycle. On the other hand, the persistence of the screen material should not be too great, as otherwise false operation may result from the overlapping of different code signals sent successively over the calling channel.

One can readily see that the invention makes it possible to actuate an alarm device at a selected station almost as soon as the code signal identifying the selected station has been emitted. Hence the number of calls capable of being made in a given time interval will be very great and will be limited only by the ability of the central station to translate incoming calls into respective code combinations. Various systems may be devised for selectively operating the connectors 33; yet, since the invention is not limited to any particular type of central office receiving equipment, any description of such systems would be beyond the scope of this specification.

Furthermore, although the invention has been described with particular reference to a specific embodiment, it should be distinctly understood that various modifications and adaptations of the arrangement described and illustrated can be made and may readily occur to those skilled in the art without departing from the spirit or exceeding the scope of my invention as defined in the objects and in the appended claims.

I claim:

1. A discriminating receiver for call signals of the type consisting of a plurality of characteristically spaced pulses including a reference pulse and several selector pulses, comprising a cathode ray tube having fluorescent screen means, a plurality of photoelectric cells positioned opposite respective portions of said screen means so as to be excitable by the ray of said tube when impinging upon said portions, sweep means for deflecting said ray at successive instants across said portions in a single sweep cycle, said sweep means being adapted to be triggered by said reference pulse to initiate the sweep cycle, ray control means normally operative to render said ray ineffective to excite said photoelectric cells, signal responsive means adapted momentarily to inactivate said ray control means in response to any of said selector pulses, whereby the ray will be made effective to excite a photoelectric cell upon arrival of a selector pulse at any of said instants, and alarm means connected to be operated only upon simultaneous excitation of all of said photoelectric cells, said fluorescent screen means consisting of a material having a persistence at least equal to substantially the duration of a sweep cycle, thereby insuring overlapping periods of excitation of all photoelectric cells excited in the course of the same sweep cycle.

2. A discriminating receiver for call signals of the type consisting of a plurality of characteristically spaced pulses including a reference pulse and several selector pulses, comprising a cathode ray tube having fluorescent screen means, a plurality of photoelectric cells positioned opposite respective portions of said screen means so as to be excitable by the ray of said tube when impinging upon said portions, sweep means for deflecting said ray at successive instants across said portions in a single sweep cycle, said sweep means being adapted to be triggered by said reference pulse to initiate the sweep cycle, ray suppressor means normally operative to reduce the intensity of said ray below the level necessary to excite said photoelectric cells, intensity control means adapted momentarily to increase the intensity of said ray above said level in response to any of said selector pulses, whereby the ray will be made effective to excite a photoelectric cell upon arrival of a selector pulse at any of said instants, and alarm means connected to be operated only upon simultaneous excitation of all of said photoelectric cells, said fluorescent screen means consisting of a material having a persistence at least equal to substantially the duration of a sweep cycle, thereby insuring overlapping periods of excitation of all photoelectric cells excited in the course of the same sweep cycle.

3. A discriminating receiver for call signals of the type consisting of a plurality of characteristically spaced pulses including a reference pulse and several selector pulses, comprising a cathode ray tube having fluorescent screen means, a plurality of photoelectric cells positioned opposite respective portions of said screen means so as to be excitable by the ray of said tube when impinging upon said portions, an alarm device, an operating circuit for said alarm device including all of said photoelectric cells in series, said circuit being adapted to conduct current sufficient to operate said alarm device only upon simultaneous excitation of all of said photoelectric cells, sweep means for deflecting said ray at successive instants across said portions in a single sweep cycle, said sweep means being adapted to be triggered by said reference pulse to initiate the sweep cycle, ray control means normally operative to render said ray ineffective to excite said photoelectric cells, and signal responsive means adapted momentarily to inactivate said ray control means in response to any of said selector pulses, whereby the ray will be made effective to excite a photoelectric cell upon arrival of a selector pulse at any of said instants, said fluorescent screen means consisting of a material having a persistence at least equal to substantially the duration of a sweep cycle, thereby insuring overlapping periods of excitation of all photoelectric cells excited in the course of the same sweep cycle.

4. A discriminating receiver for call signals of the type consisting of a plurality of characteristically spaced pulses including a reference pulse and several selector pulses, comprising a cathode ray tube having fluorescent screen means, a plurality of photoelectric cells positioned opposite respective portions of said screen means so as to be excitable by the ray of said tube when impinging upon said portions, an alarm device, an operating circuit for said alarm device including all of said photoelectric cells in series, said circuit being adapted to conduct current sufficient to operate said alarm device only upon simultaneous excitation of all of said photoelectric cells, sweep means for deflecting said ray at successive instants across said portions in a single sweep cycle, said sweep means being adapted to be triggered by said reference pulse to initiate the sweep cycle, ray suppressor means normally operative to reduce the intensity of said ray below the level necessary to excite said photoelectric cells, and intensity control means adapted momentarily to increase the intensity of said ray above said level in response to any of said selector pulses, whereby the ray will be made effective to excite a photoelectric cell upon arrival of a selector pulse at any of said instants, said fluorescent screen means consisting of a material having a persistence at least equal to substantially the duration of a sweep cycle, thereby insuring overlapping periods of excitation of all photoelectric cells excited in the course of the same sweep cycle.

5. A discriminating receiver for call signals of the type consisting of a plurality of characteristically spaced pulses including a reference pulse and several selector pulses, comprising a cathode ray tube, a plurality of target devices excitable by electronic energy from the ray of said tube, sweep means for deflecting said ray at successive instants, in a single sweep cycle, into a plurality of operative positions such as respectively to excite the said target devices, said sweep means being adapted to be triggered by said reference pulse to initiate the sweep cycle, ray control means normally operative to render said ray ineffective to excite said target devices, signal responsive means adapted momentarily to inactivate said ray control means in response to any of said selector pulses, whereby the ray will be made effective to excite a target device upon arrival of a selector pulse at any of said instants, delay means for maintaining each target device excited at least to the end of the sweep cycle during which the said pulse arrived, whereby target devices excited in the course of the same sweep cycle will have overlapping periods of excitation, said delay means including energy storing means responsive to triggering by said ray, and alarm means connected to be operated only upon simultaneous excitation of all of said target devices.

6. A discriminating receiver for call signals of the type consisting of a plurality of characteristically spaced pulses including a reference pulse and several selector pulses, comprising a cathode ray tube, a plurality of target devices excitable by electronic energy from the ray of said tube, sweep means for deflecting said ray at successive instants, in a single sweep cycle, into a plurality of operative positions such as respectively to excite the said target devices, said sweep means being adapted to be triggered by said reference pulse to initiate the sweep cycle, ray suppressor means normally operative to reduce the intensity of said ray below the level necessary to excite said target devices, intensity control means adapted momentarily to increase the intensity of said ray above said level in response to any of said selector pulses, whereby the ray will be made effective to excite a target device upon arrival of a selector pulse at any of said instants, delay means for maintaining each target device excited at least to the end of the sweep cycle during which the said pulse arrived, whereby target devices excited in the course of the same sweep cycle will have overlapping periods of excitation, said delay means including energy storing means responsive to triggering by said ray, and alarm means connected to be operated only upon simultaneous excitation of all of said target devices.

THOMAS I. RESS.

REFERENCES CITED

The following references are of record in the file of this patent:

UNITED STATES PATENTS

| Number | Name | Date |
|---|---|---|
| 2,057,773 | Finch | Oct. 20, 1936 |
| 2,214,019 | Gray | Sept. 10, 1940 |
| 2,396,211 | Skellet | Mar. 5, 1946 |
| 2,438,928 | Labin | Apr. 6, 1948 |